United States Patent
Koral et al.

(10) Patent No.: US 11,997,756 B2
(45) Date of Patent: May 28, 2024

(54) DETECTION OF UNLIKELY TRAVEL OF MOBILE DEVICES INDICATIVE OF FRAUDULENT MOBILE DEVICE USAGE

(71) Applicant: AT&T Intellectual Property I, L.P., Atlanta, GA (US)

(72) Inventors: Yaron Koral, Cherry Hill, NJ (US); Lauro Lins, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 317 days.

(21) Appl. No.: 17/480,384

(22) Filed: Sep. 21, 2021

(65) Prior Publication Data

US 2023/0087506 A1    Mar. 23, 2023

(51) Int. Cl.
  *H04M 3/00*    (2006.01)
  *H04W 8/24*    (2009.01)
  *H04W 36/32*   (2009.01)

(52) U.S. Cl.
  CPC ............. *H04W 8/24* (2013.01); *H04W 36/32* (2013.01)

(58) Field of Classification Search
  CPC ....... H04W 8/24; H04W 36/32; H04W 12/69; H04W 8/02; H04W 8/18; H04W 24/02; H04W 36/00; H04W 24/04; H04W 12/12
  USPC ........................................................ 455/418
  See application file for complete search history.

(56) References Cited

U.S. PATENT DOCUMENTS

| | | | |
|---|---|---|---|
| 9,210,256 B1 * | 12/2015 | Humphrey ............ | H04M 15/44 |
| 9,338,605 B2 * | 5/2016 | Guba .................... | H04W 48/04 |
| 9,715,713 B1 * | 7/2017 | Humphrey ............ | H04M 15/58 |
| 10,028,106 B2 * | 7/2018 | Madhav ................. | H04W 4/48 |
| 10,178,524 B2 * | 1/2019 | Chalmers ............... | H04W 4/40 |
| 10,187,513 B2 * | 1/2019 | Way ....................... | H04L 43/045 |
| 10,237,280 B2 * | 3/2019 | Day, II .................. | H04L 63/102 |
| 10,268,530 B2 * | 4/2019 | Breaux .................. | B60K 35/00 |
| 10,271,265 B2 * | 4/2019 | Breaux, III ........... | H04W 4/021 |
| 10,326,877 B2 * | 6/2019 | Hodges ................. | H04W 4/38 |
| 11,032,754 B2 * | 6/2021 | Breaux, III ........... | H04W 76/14 |
| 11,178,272 B2 * | 11/2021 | Breaux ................. | H04M 1/72454 |
| 2008/0070593 A1 * | 3/2008 | Altman ................. | H04W 4/029 455/457 |
| 2012/0237908 A1 * | 9/2012 | Fitzgerald ............. | H04W 4/029 434/236 |

(Continued)

*Primary Examiner* — Amancio Gonzalez
(74) *Attorney, Agent, or Firm* — Guntin & Gust, PLC; Dana B. LeMoine

(57) ABSTRACT

The disclosed technology is directed towards detecting improbable speeds of a mobile device, which can indicate fraudulent activity with respect to the mobile device. Radio access network events and call detail records are processed to determine when a mobile device "travel jumps" between locations at improbable speeds. Events corresponding to handovers between adjacent cells are filtered out. For events corresponding to changed cell towers that are non-adjacent, further processing is performed to determine the speed of the mobile device travel between the cells. A first speed threshold is selected based on possible air travel (a cell near an airport) or a second non-air travel speed threshold is selected. If the speed of the mobile device exceeds the selected speed threshold, a travel jump is determined. Exceptions can be made for gaps in connectivity due to topography (known inconsistent reception areas) and for a mobile device shutting down and restarting.

20 Claims, 11 Drawing Sheets

(56) References Cited

U.S. PATENT DOCUMENTS

2015/0288788 A1* 10/2015 Liu ..................... H04W 4/02
                                                    455/414.1
2016/0280230 A1*  9/2016 Hsieh ................... B60Q 9/00
2017/0186003 A1*  6/2017 Monaghan .......... G06Q 20/405

* cited by examiner

DETECTION OF UNLIKELY TRAVEL OF MOBILE DEVICES INDICATIVE OF FRAUDULENT MOBILE DEVICE USAGE

TECHNICAL FIELD

The subject application relates to wireless communications systems in general, and more particularly to detection of fraudulent mobile device activity.

BACKGROUND

With mobile devices, many malicious (including fraudulent) activities involve an abuse of the mobile device identity or mobile subscriber identity. These activities are arduous to detect and can cause network disturbances and loss of money to the subscriber.

In general, such malicious activities involve replicating subscriber identity (or identification) module (SIM) cards, spoofing the device identity, operating two or more devices with the same identity simultaneously, SIM swaps, and others. For example, a SIM swap allows someone else's mobile device to receive a two-factor authentication code that a financial institution believes it is sending to the mobile device of the correct customer, which thereby defeats two-factor authentication protection.

Detecting such activities on a carrier-grade scale would involve monitoring hundreds of millions of devices. With the evolution of mobile devices to new radio (fifth generation and beyond), it is expected that a large number of IoT (Internet-of-Things) devices of different kinds will join the network; the identities of IoT devices provide attackers with access to cellular bandwidth that can be abused, and in some cases, allow attackers access to critical systems and infrastructure. As such, it is a complex problem to discern valid actions of a mobile device from actions that are likely indicative of malicious activity.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
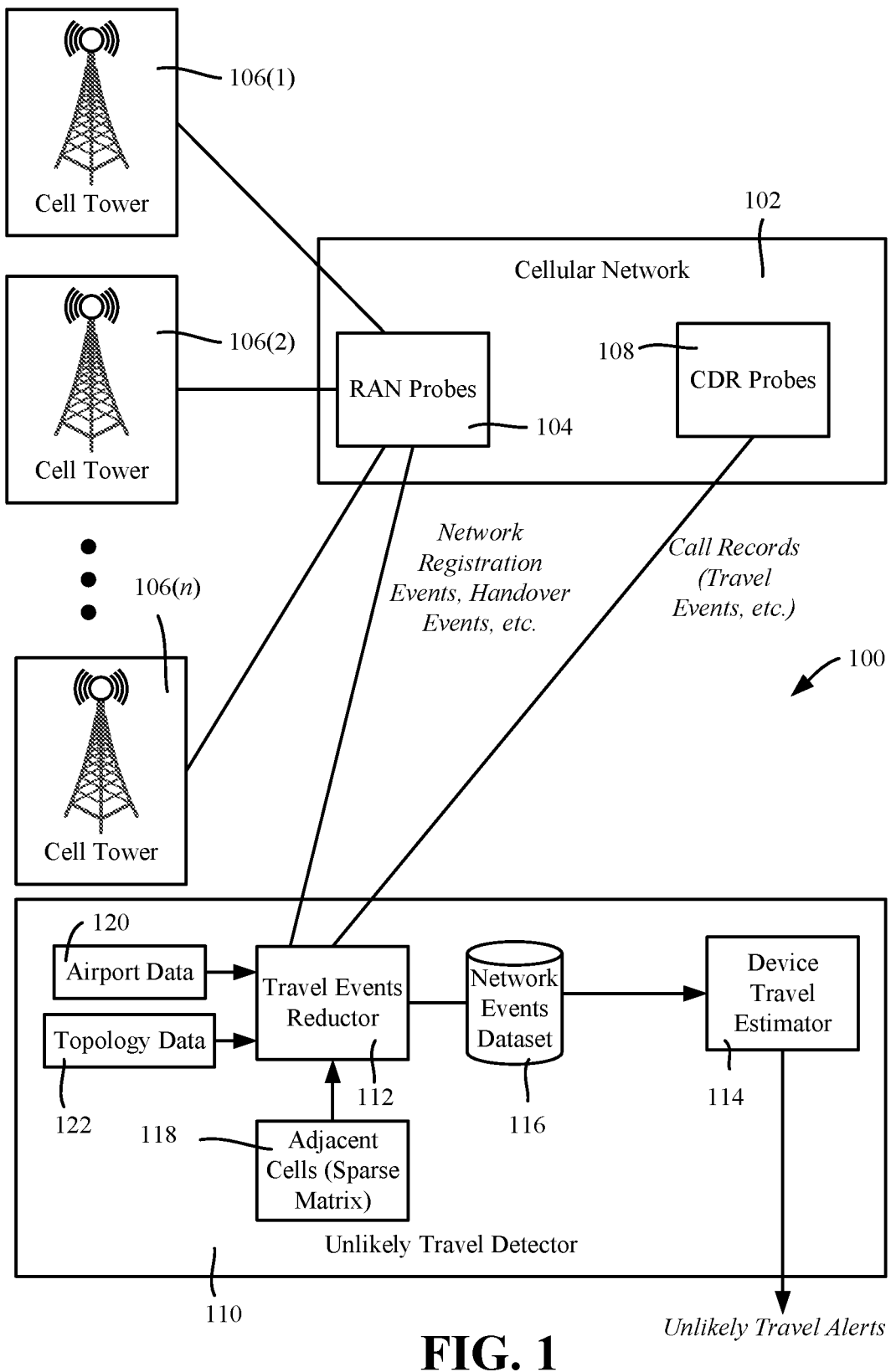
FIG. 1 is a block diagram illustrating an example wireless communication system configured to detect unlikely travel of a mobile device, in accordance with various aspects and embodiments of the subject disclosure.

The technology described herein is generally directed towards identifying anomalies in a mobility network based on detecting mobile devices and/or subscribers appearing in different locations at improbable times. In general and as described herein, the technology processes the radio access network (RAN) events and call detail records (CDRs) to determine mobile device locations and times to determine improbable device travel speed, while operating in a way that reduces false positives in detecting actual fraud versus valid behavior. In general, the technology works at a coarse grain level and therefore is scalable capture mobile devices through the entire network, including tracking on the order of hundreds of millions devices.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a cellular network 102 is configured with radio access network (RAN) probes 104 that collect from the cell towers 106(1)-106(n) the RAN events associated with mobile devices and subscribers of the cellular network 102. The cellular network 102 also collects call detail records (CDRs) via CDR probes 108.

The information collected by the RAN probes 104 provides insights about a mobile device's location, including more granular events such as network registration events and handover (movement) events of a mobile device. The call detail records collected by the CDR probes 108 can be collected from multiple sources, and provide additional information such as when a mobile device is roaming on a different network.

In addition to tracking network events as collected by probing systems that contain RAN events and call detail records (CDRs), the system tracks the International Mobile Equipment Identifier (IMEI), which identifies the mobile device equipment, and the International Mobile Subscriber Identifier (IMSI), which identifies the subscriber. Together the IMEI and IMSI represent and can be referred to herein as the "mobile device" or the "device." Note that these two information elements may be missing from some of the collected network records when a mobile device could not complete network registration. It is not feasible to detect unlikely travel in these cases because there is no way to correlate network events under the same mobile device.

In one implementation generally shown in FIG. 1, an unlikely travel detector 110 includes separate modules/components as part of the architecture, namely a travel events reductor 112, which operates to reduce the number of events that the rest of the system needs to process. A device travel estimator 114 analyzes the travel of mobile devices, per single mobile device.

Note that while it is reasonably straightforward to detect wholly impossible scenarios, such as a mobile device connected to a cell tower on the East coast connecting a few minutes later to a cell tower on the West coast, detecting improbable distances for many fraudulent activities is more subtle and complex. As set forth above, one challenge is detecting these occurrences on a carrier-grade scale, which involves monitoring hundreds of millions of devices. Another challenge results from the inaccurate location information available for this task. Consider that estimating a location is based on the cell tower/site the device was connected to at a particular time, covering a certain radius around the cell tower location. The estimation accuracy varies on areas with a high density of cell towers, such as metro areas, compared to sparse deployment areas such as rural areas. Existing geo-fencing capabilities are sometimes useable to detect location-related violations, but they only can be applied to a small number of devices within specific defined areas. This technology described herein works on a coarse grain level, and therefore can be scaled to capture an entire network, tracking on the order of hundreds of millions devices.

In general, the travel events reductor 112 filters out events that result from conventional, adjacent cell tower handovers, to provide a network event dataset 116 to the device travel estimator 114 that contains events that may be travel jumps that require further investigation. The device travel estimator 114 performs such a further investigation.

More particularly, the device travel estimator 114 takes the RAN events and CDR events generated by a particular mobile device in the post-filtered network events dataset 116. Each event contains the device's IMSI, IMEI, cell tower, and observed event type. An event type that appears in a CDR can be a voice call, data transfer, or text delivery; these are events that indicate the user plane activity of the device. Relevant event types the system collects from the RAN probing records include network registration and handover events, which show when the mobile device switched to a different cell tower to improve radio conditions. Such RAN events can explain scenarios where a mobile device seemed to travel long distances without connecting to interim cell towers, which is typically because the mobile device disconnected from the network.

The device travel estimator 114 operates to order CDR events by ascending time of occurrence, and extract cases where the cell tower changed, that is, to a non-adjacent (non-filtered out) cell tower. For each cell tower change, the device travel estimator 114 calculates the great circle distance between the two cell towers involved based on their latitude and longitude coordinates using the Haversine formula.

Figure 2:
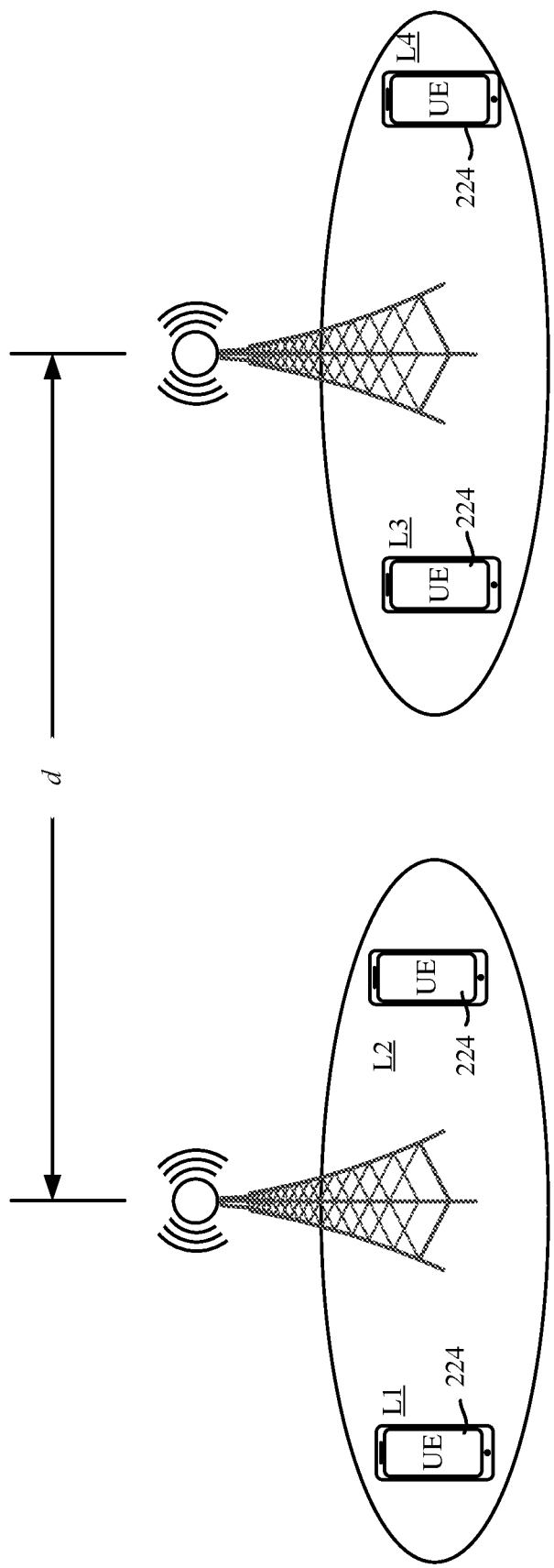
FIG. 2 is a representation of cell towers and various possible locations of a mobile device, in accordance with various aspects and embodiments of the subject disclosure.

Note that the distance between the cell towers only provides a rough estimate of the distance between the two observed locations of the device. The error resulting from the rough estimate can be significant in situations where the cell towers are close to each other. For example, FIG. 2 depicts two cell towers and a mobile device 224 at different locations L1-L4. The distance d between the cell towers may be an underestimate if the locations of the mobile device 224 were location L1 followed by location 4. On the contrary, if the device were at locations L2 and L3, the distance d would be an overestimate.

One way to correct this error is to discard events that involve adjacent cell towers, which is a correction performed by the travel events reductor 112, as described herein. Another way to improve the location estimation is to include signal quality with respect to a cell tower. Signal measurements such as RSRP (radio signal received power) and RSRQ (radio signal received quality) help determine the distance from the cell tower antenna.

After obtaining the distance between the two device locations, the calculation of travel speed (which can be velocity is direction is material) is obtained by dividing the distance by the elapsed time. In one implementation, a threshold for maximum reasonable travel velocity is defined as 700 mph. This threshold considers typical cruising airspeed for a long-distance commercial passenger aircraft, approximately 550-580 mph. Such a model is conservative as it explains any travel between relatively far apart cell towers as air travel. To further improve the accuracy of the model, the technology maps cell towers that are nearby airports (shown in FIG. 1 as airport data 120), e.g., within a threshold distance thereto, and considers whether air travel is a possibility. The maximum reasonable travel velocity between cell towers when neither cell tower is near an airport is 150 mph, which is based on a fast car speed. As is understood, these are only example threshold values for air and non-air travel; other thresholds can be used, and other situations can have other thresholds.

Figure 3:
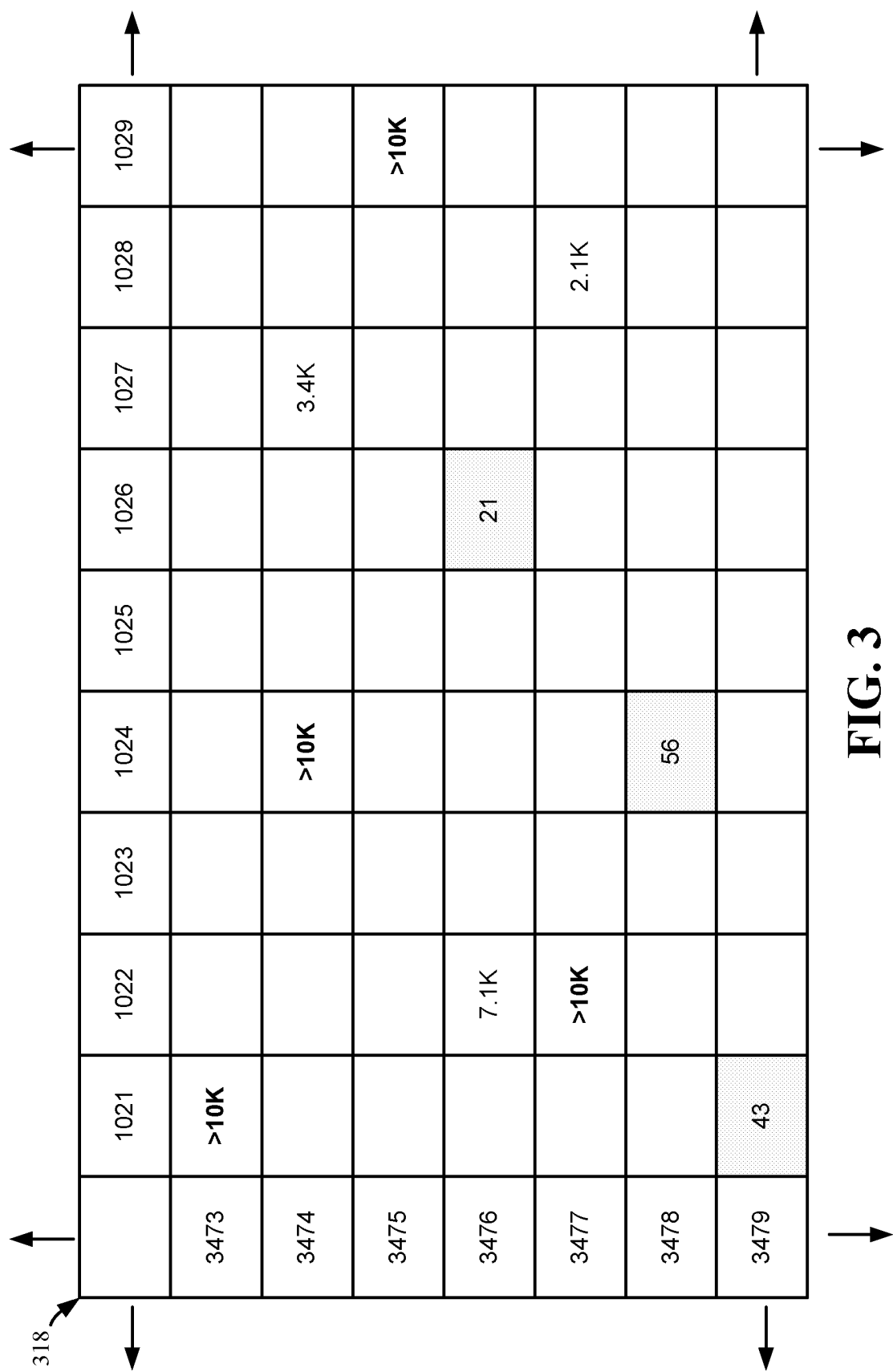
FIG. 3 is a data structure representing part of a sparse matrix that tracks handovers between cells, in accordance with various aspects and embodiments of the subject disclosure.

As set forth herein, the travel events reductor 112 reduces the number of available events to provide the event dataset 116 that needs to be analyzed by the device travel estimator 114. The travel events reductor 112 maintains a list (or other data structure) of successful handovers. Each successful handover indicates that a mobile device successfully switched its connectivity between one cell tower to another, generally providing better radio conditions concerning the cellular device location. Such a handover usually happens when a device moves and gets away from the serving cell tower and gets closer to another cell tower. As shown in FIG. 1, the system maintains a data structure (e.g., a sparse matrix) 118 of adjacent cell towers using the handover events. A partial sparse matrix 318 is shown in FIG. 3, which shows counts of handovers between cell towers (numbered for example purposes as 1021-1029 and 3473-3479).

An advantage of a sparse matrix is that it supports different types of coverage areas. Metro areas in which there are relatively many cell towers over a relatively small space and more handover options from one cell tower to another are captured, as well as rural areas where the cell towers are located relatively farther apart from each other and cover relatively larger areas. Any change of cell tower that involves a pair of antennas not in the sparse matrix is considered a "travel jump," which is evaluated by the device travel estimator 114 to determine whether the travel jump is legitimate or likely indicative of fraudulent/malicious activity.

There are legit reasons where a mobile device appears to hump from one location to another. One example previously described is air travel, where devices cannot maintain network connectivity (e.g., devices are required to switch into airplane mode). The travel events reductor 112 tags events with cell towers that are near airports (airport data 120) to notify the device travel estimator 114.

Another reason is when the mobile device's battery runs out (or the mobile device is switched off) while the device is on the move. Such a case generates network radio events such as clean detach from the network and a change in the paging frequency for the mobile device. The device travel estimator 114 can identify this situation to increase the certainty of the estimate.

Yet another reason involves areas with a lack of reception or when the mobile device is in vicinity to a border. Such events are closely related to the network topology. For example, in areas with poor reception, it is expected that many devices lose reception and appear to be 'jumping' geographically. This is similar for areas close to international borders where devices switch between cellular providers, whereby for an observer at one of the networks, it appears as if the devices 'jump' between one location and another. Network topology phenomena are learned over time, e.g., using machine learning analytics, and can be used by the travel events redactor 112 (e.g., via topology data 122 that identifies cell towers that experience such phenomena) and/or the device travel estimator 114.

In sum, the travel events reductor 112 consumes RAN and CDR events, e.g., from Hadoop repositories. To scale the reduction process for the many events of the many mobile devices, mapper components can be assigned ranges of device identifiers, and each mapper, for its assigned range, detects changes in cell towers. These changes are reduced by comparing the events to the sparse cell matrix that contains possible handovers and filtering out conventional handover events. Each mapper can flag cell towers near airports and add topology tags to the remaining cell tower pairs, and send the flagged/tagged events for analysis by the device travel estimator 114. In turn, the device travel estimator 114 generates alerts of unlikely travel events.

Figure 4:
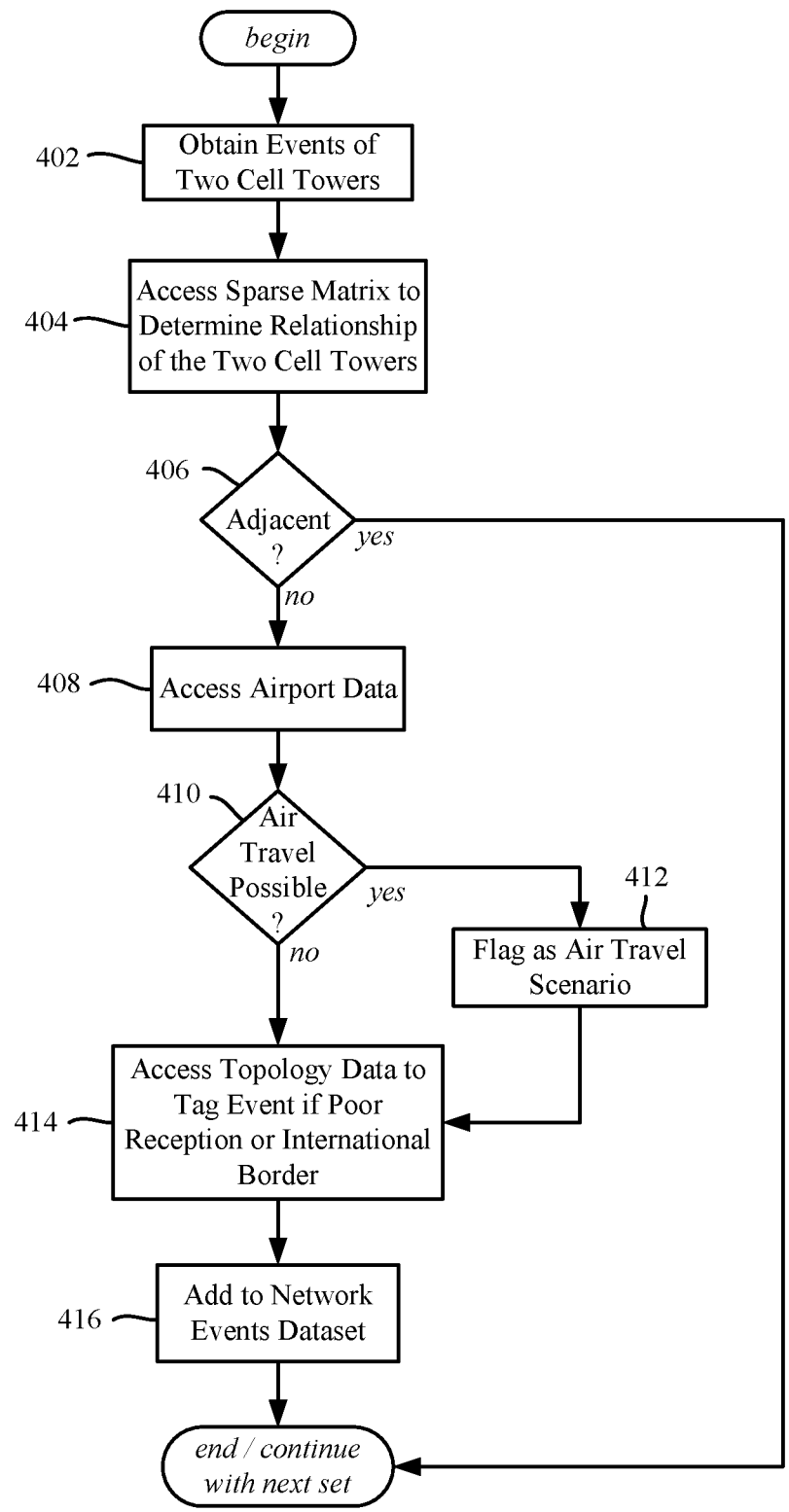
FIG. 4 is a flow diagram representing example operations that can be taken to reduce a number of events related to handovers and to prepare remaining events for further processing, in accordance with various aspects and embodiments of the subject disclosure.

FIG. 4 summarizes example operations of the travel events reductor 112 (or a mapper component that processes a range/subset of identifiers), beginning at operation 402 where event data of a mobile device with respect to a change between two cell towers are obtained for processing. Operation 404 accesses the sparse matrix to determine if the cell towers are adjacent, and if so, operation 406 ends the process for this pair, and generally continues with another pair. Note that this does not necessarily discard the events, e.g., a handover from cell A to adjacent cell B can result in the event data for cell tower A being discarded, but the event data for cell tower B may be used with event data of a next cell tower to which the mobile device connected.

If not a handover to an adjacent cell, operation 408 accesses the airport data structure to determine if one or both cell towers are near an airport. If air travel is possible as evaluated at operation 410, operation 412 flags the event data as an air travel scenario.

Operation 414 accesses the topology data structure to tag the event data with any topology data that may be relevant to the device travel estimator 114. Operation 416 adds the events to the network event dataset for processing by the device travel estimator 114.

Figure 5:
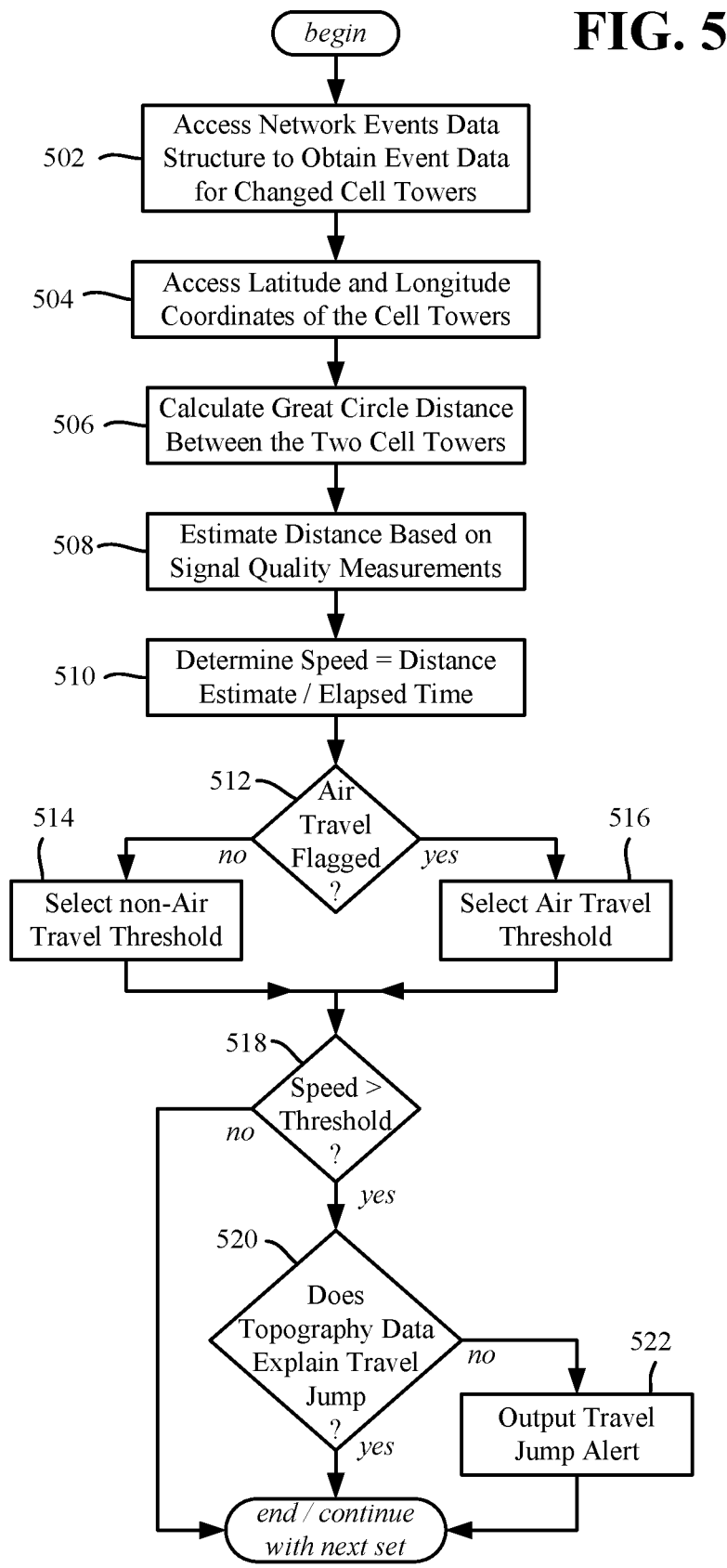
FIG. 5 is a flow diagram representing example operations related to determining a travel jump indicative of possible fraudulent activity, in accordance with various aspects and embodiments of the subject disclosure.

FIG. 5 summarizes example operations of the device travel estimator 114 beginning at operation 502 where event data for a mobile device with a change between cell towers is accessed. As described herein, in this example such a change is not for a handover between adjacent cell towers, as such event data is filtered out.

Operation 504 obtains the known latitude and longitude coordinates of the cell towers, which is used at operation 506 to calculate the great circle distance between them. Operation 508 adjusts the calculated distance to an estimated distance based on signal quality measurements. The speed is thus the distance estimate over the elapsed time between when the mobile device left the coverage area of one cell tower and entered the coverage area of another cell tower.

As set forth herein, in one implementation air travel is flagged (FIG. 4, operation 412) in a situation in which air travel is possible due to one (or both) of the cell towers being near an airport. If not flagged as evaluated by operation 512, then a non-air travel threshold speed (e.g., 150 mph) is selected at operation 514. If instead flagged as evaluated by operation 512, then an air travel threshold speed (e.g., 700 mph) is selected at operation 516.

Operation 518 compares the calculated speed with the selected threshold. If the selected threshold is not met by the calculated speed (whether greater than or greater than or equal to is used), then there is not a travel jump situation and the process ends for this set of event data/pair of cell towers.

If the speed threshold was met/exceeded, then operation 520 evaluates whether any tagged topography data exists that can explain the travel jump, basically whether the cell towers are known to be located where inconsistent reception (frequent network disconnections) is known to occur. If not, operation 522 generates an alert, e.g., outputs a travel jump alert indicative of possibly improper mobile device usage; otherwise no alert is output. Note that a modified alert can be output in such an inconsistent reception situation, such as a warning as opposed to a "highly likely" fraud alert.

Note that FIG. 5 does not explicitly show battery failures/device power off evaluation, although it is understood that such situations can be detected via clean detach/paging frequency evaluation. If detected as such then a travel jump alert is not output.

It should be noted that some action can be taken when a travel jump is not determined to have occurred. For example, one or more counters can be incremented to maintain statistics of detected travel jumps versus speed below the threshold, unexplained travel jumps versus topology-induced high calculated speeds, and so on. Such statistics can be used to refine the process, e.g., to adjust thresholds, fine-tune topology data, and so forth.

As should be understood, the example operations performed by the travel events reductor 112 and the device travel estimator 114 are only examples for one example implementation, and are not limited to any strict role division. Indeed, some or all example components can be combined, or further divided into additional components. As one example, the device travel estimator 114 (or an intermediate component, not shown) can access airport data to determine cell towers near airports, instead of the travel events reductor 112 doing so. Similarly, the device travel estimator 114 (or an intermediate component, not shown) can deal with topology-related data directly rather than have the travel events reductor 112 tag such events. Conversely, the travel events reductor 112 or another intermediate component can perform the ordering of CDR events by ascending time of occurrence, and so on, so that the work of the device travel estimator 114 is lessened.

Figure 6:
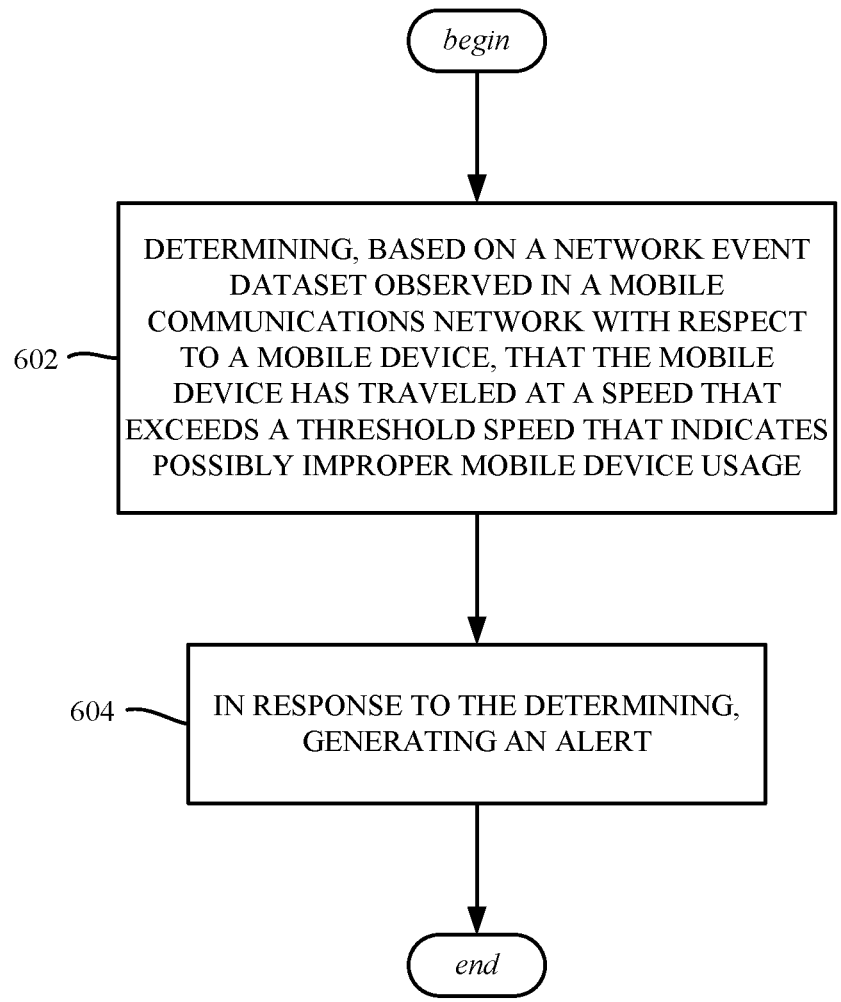
FIG. 6 is a flow diagram representing example operations related to detecting when a mobile device has traveled too fast indicating possible improper mobile device usage, in accordance with various aspects and embodiments of the subject disclosure.

One or more example aspects are represented in FIG. 6, and can correspond to a system, comprising a processor, and a memory that stores executable instructions that, when executed by the processor, facilitate performance of operations. Example operation 602 represents determining, based on a network event dataset observed in a mobile communications network with respect to a mobile device, that the mobile device has traveled at a speed that exceeds a threshold speed that indicates possibly improper mobile device usage. Operation 604 represents, in response to the determining, generating an alert.

The network event dataset can include call detail records. The network event dataset can include radio access network events.

The network event dataset can identify the mobile device based on an international mobile equipment identifier associated with the mobile device and an international mobile subscriber identifier associated with the mobile device.

Further operations can include reducing a total number of events associated with the mobile device to obtain the network event dataset. Reducing the total number of events associated with the mobile device to obtain the network event dataset can include discarding events that involve adjacent cell sites. Reducing of the total number of events associated with the mobile device to obtain the network event dataset can include maintaining a handover dataset comprising successful handover events of the mobile device between cell sites, evaluating the successful handover events with respect to a data structure representing adjacent cell sites, and removing network events corresponding to the successful handover events that are between adjacent cell sites. The data structure can be a sparse matrix.

Further operations can include identifying network events in the network event dataset that are within a threshold distance of an airport; determining that the mobile device has traveled at the speed that exceeds the threshold speed can include selecting as the threshold speed a first threshold speed for a respective time-ordered pair of network events in which at least one event of the respective time-ordered pair is within the threshold distance of the airport, and selecting a second threshold speed for time-ordered pairs of network events in which no event of the respective time-ordered pair is within the threshold distance of the airport.

Further operations can include identifying at least one of: network events in the network event dataset that indicate the mobile device is not connected to the network, or an area in which the mobile device has traveled that has inconsistent reception according to a consistency criterion.

Figure 7:
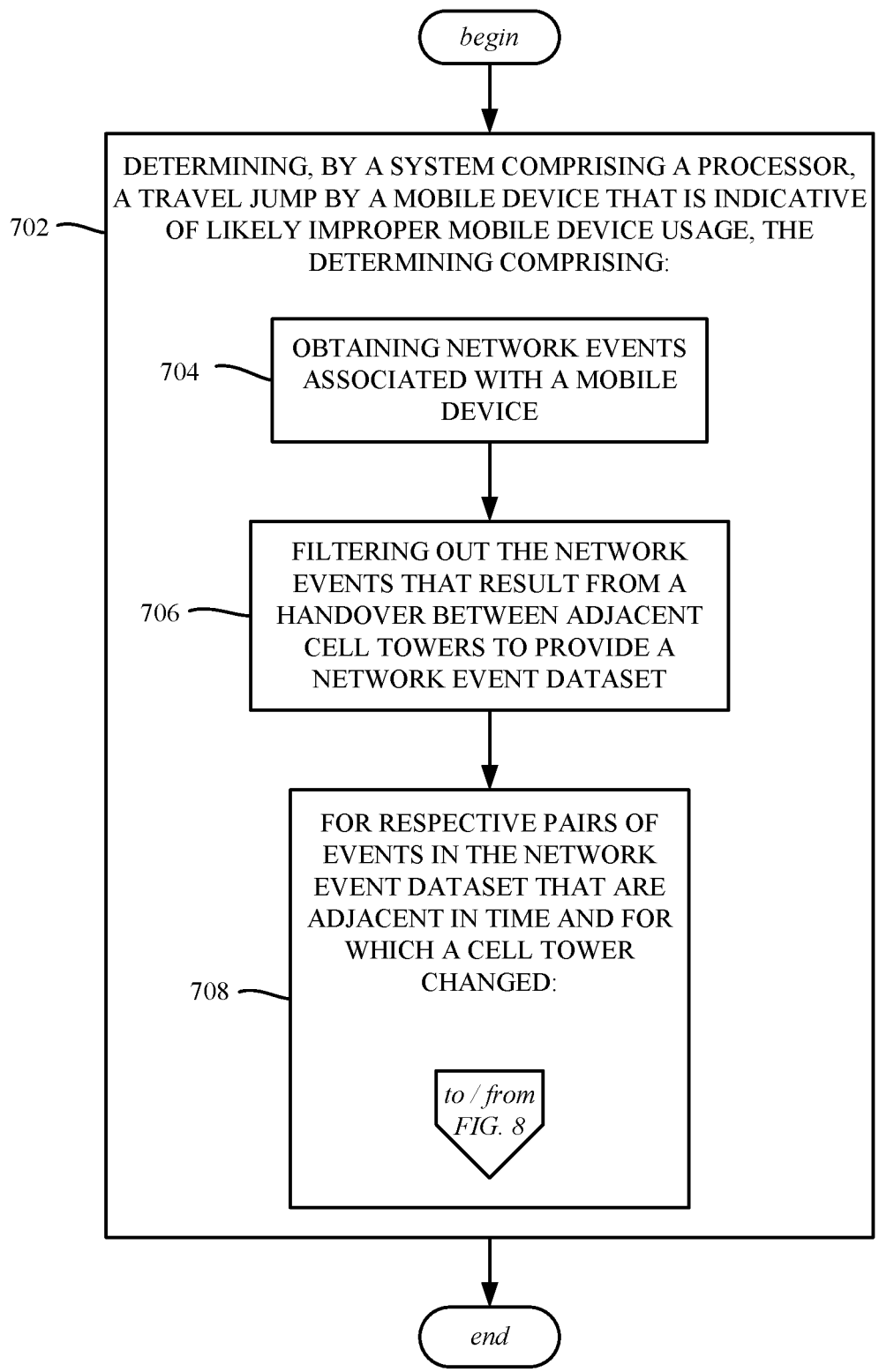
FIGS. 7 and 8 comprise a flow diagram representing example operations related to detecting travel jumps of mobile devices based on network events, in accordance with various aspects and embodiments of the subject disclosure.
Figure 8:
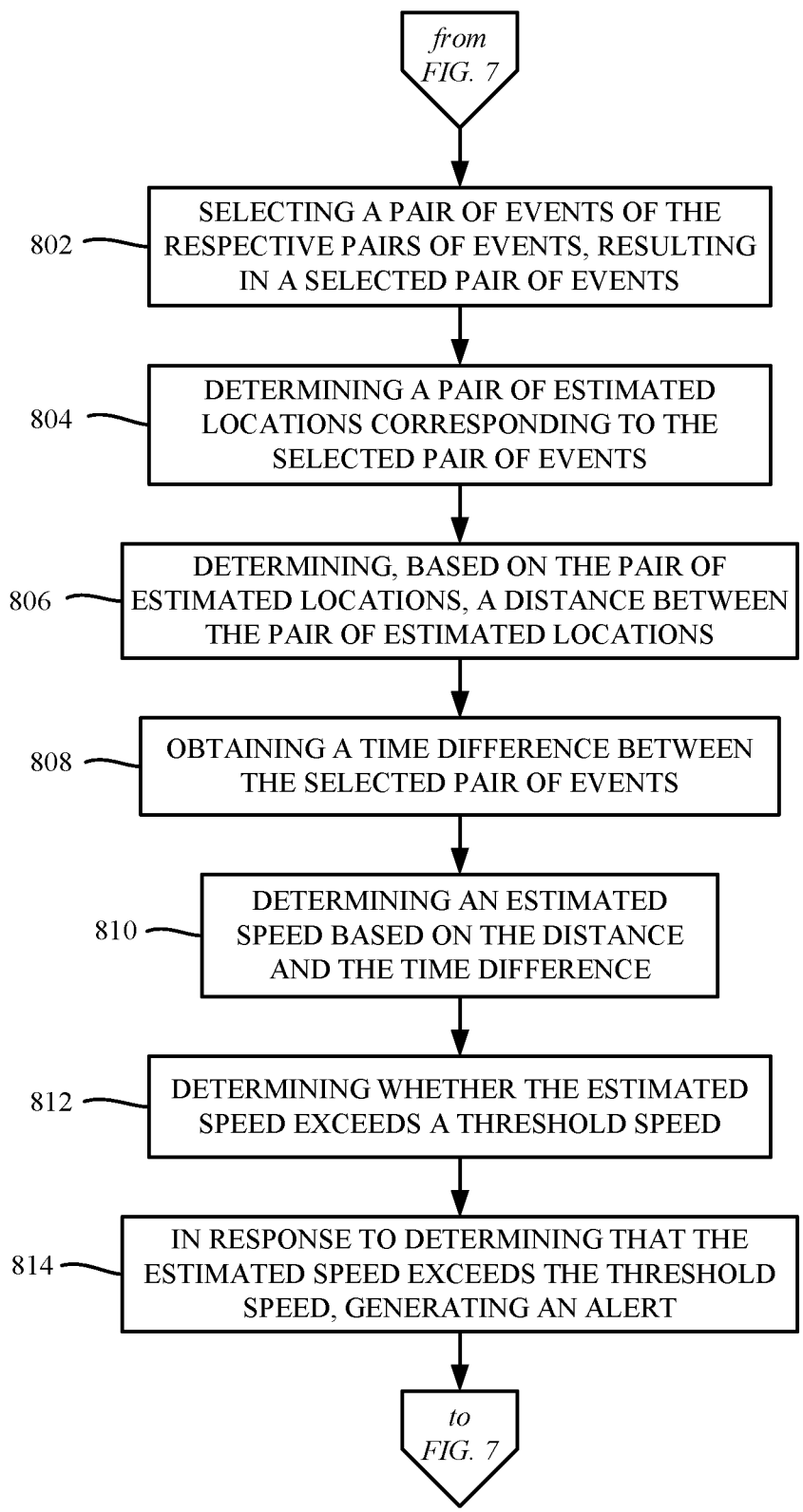

One or more example aspects are represented in FIGS. 7 and 8, and can correspond to operations, e.g., of a method. Operation 702 represents determining, by a system comprising a processor, a travel jump by a mobile device that is indicative of likely improper mobile device usage. The determining can include operations 704-708 of FIG. 7 and operations 804-814 of FIG. 8. Operation 704 represents obtaining network events associated with a mobile device. Operation 706 represents filtering out the network events that result from a handover between adjacent cell towers to provide a network event dataset. Operation 708 represents, for respective pairs of events in the network event dataset that are adjacent in time and for which a cell tower changed, operations 802-814 of FIG. 8. In FIG. 8, operation 802 represents selecting a pair of events of the respective pairs of events, resulting in a selected pair of events. Operation 804 represents determining a pair of estimated locations corresponding to the selected pair of events. Operation 806 represents determining, based on the pair of estimated locations, a distance between the pair of estimated locations. Operation 808 represents obtaining a time difference between the selected pair of events. Operation 810 represents determining an estimated speed based on the distance and the time difference. Operation 812 represents determining whether the estimated speed exceeds a threshold speed. Operation 814 represents, in response to determining that the estimated speed exceeds the threshold speed, generating an alert.

Obtaining of the network events associated with the mobile device can include obtaining the network events for which cell towers have been determined to have changed between respective pairs of network events.

Determining the estimated locations corresponding to the selected pair of events can include evaluating respective signal quality data with respect to the selected pair of events and cell tower locations associated with the selected pair of events.

Further operations can include identifying, by the system in the network event dataset, a cell site within a threshold distance of an airport, and, for the selected pair of events, selecting as the threshold speed a first threshold speed for in which at least one event of the selected pair of events is within the threshold distance of the airport, and selecting a second threshold speed for in which no event of the pair of events are within the threshold distance of the airport.

Further operations can include identifying, by the system in the network event dataset, radio event data indicating that disconnection of the mobile device from the network is a likely cause of the travel jump.

Further operations can include identifying, by the system in the network event dataset, radio event data indicating an estimated location in which inconsistent reception is a likely cause of the travel jump.

Figure 9:
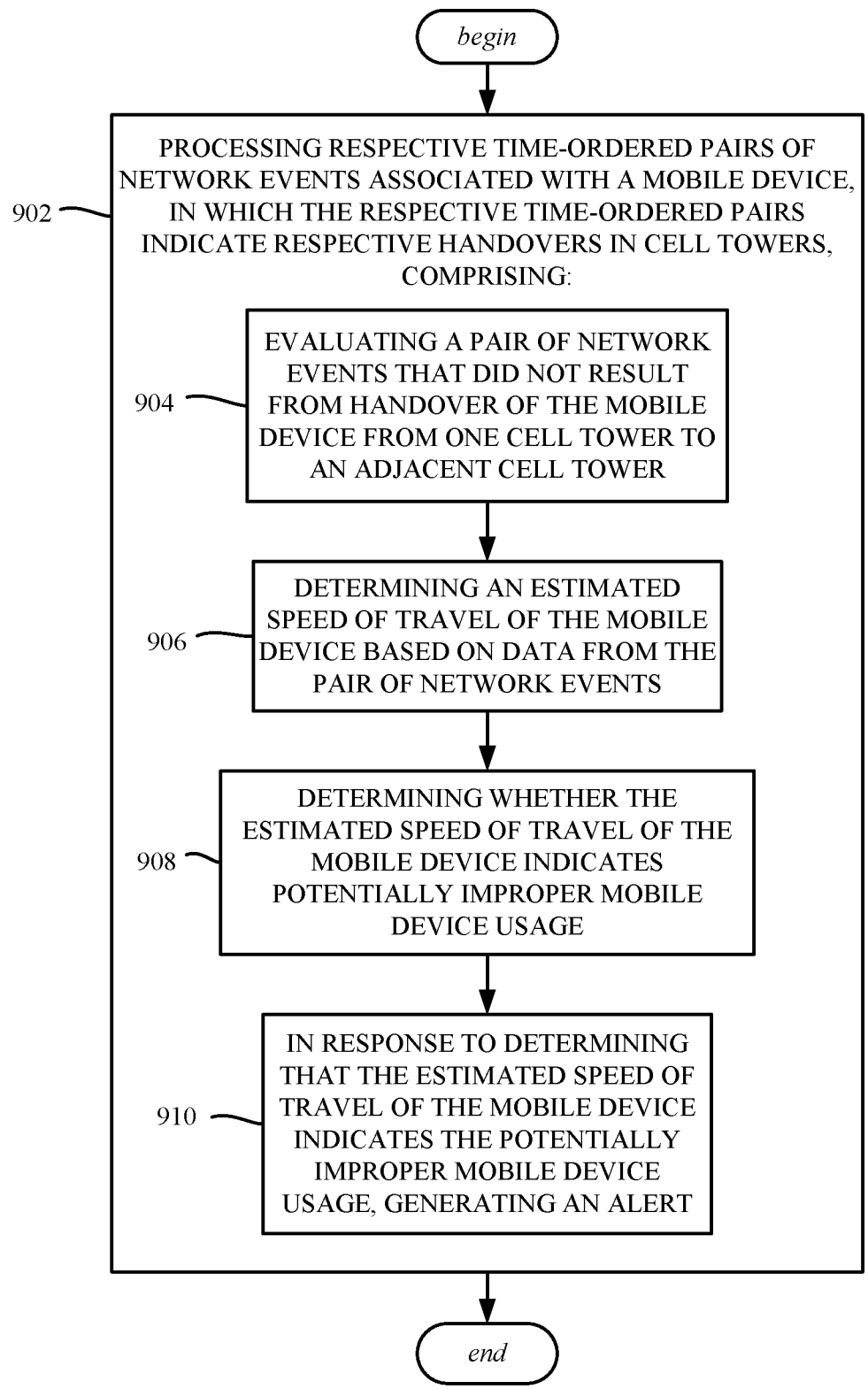
FIG. 9 is a flow diagram representing example operations related to processing event data to determine whether an estimated speed of travel of a mobile device indicates potentially improper mobile device usage, in accordance with various aspects and embodiments of the subject disclosure.

One or more aspects are represented in FIG. 9, such as implemented in a machine-readable medium, comprising executable instructions that, when executed by a processor, facilitate performance of operations. Example operation 902 represents processing respective time-ordered pairs of network events associated with a mobile device, in which the respective time-ordered pairs indicate respective handovers in cell towers, including operations 904-910. Operation 904 represents evaluating a pair of network events that did not result from handover of the mobile device from one cell tower to an adjacent cell tower. Operation 906 represents determining an estimated speed of travel of the mobile device based on data from the pair of network events. Operation 908 represents determining whether the estimated speed of travel of the mobile device indicates potentially improper mobile device usage. Operation 910 represents, in response to determining that the estimated speed of travel of the mobile device indicates the potentially improper mobile device usage, generating an alert.

The data in the pair of network events can include time data, cell tower location data and signal quality data.

Determining whether the estimated speed of travel of the mobile device indicates the potentially improper mobile device usage can include comparing the estimated speed with an air travel threshold speed limit when the data in the pair of network events indicates a cell tower that is within a specified distance of an airport.

Evaluating of the pair of network events that did not result from handover of the mobile device from the one cell tower to the adjacent cell tower can include maintaining a sparse matrix that represents adjacent cell towers, determining, based on the sparse matrix, when respective pairs of cell towers, which correspond to respective pairs of events, are adjacent, and eliminating respective pairs of events that resulted from ones of the respective handovers of the mobile device between cell towers that are adjacent.

As can be seen, the technology described herein identifies anomalies in a mobility network that involve mobile devices and subscribers appearing in different locations at improbable times. The technology described herein provides significant value in uncovering a variety of fraudulent scenarios. The technology scales well, which is significant because it is expected that a large number of IoT devices of different kinds will join the network. This enormous increase in capacity and variety benefits from technology that detects abnormal fraudulent activities.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-1-DMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 10:
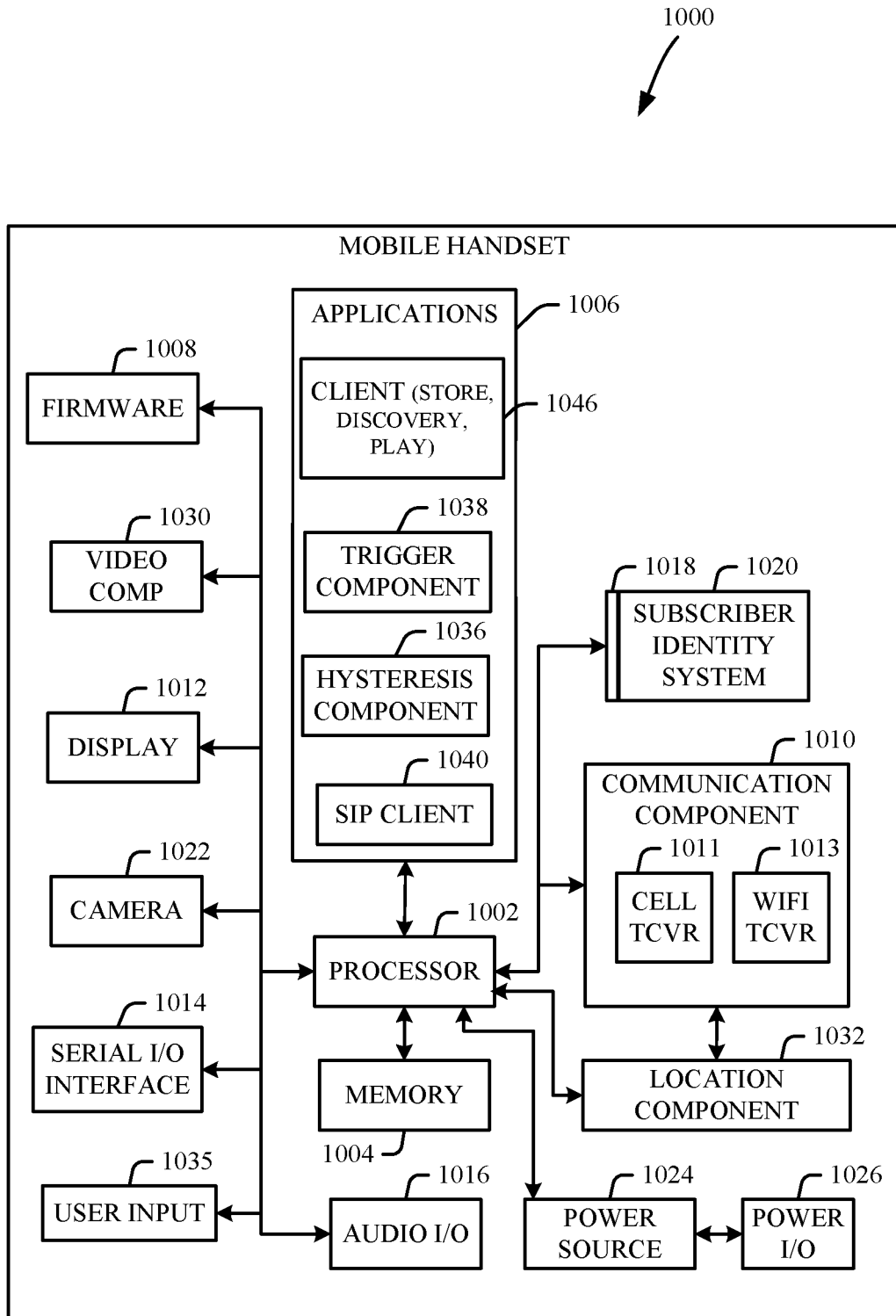
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device (such as user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
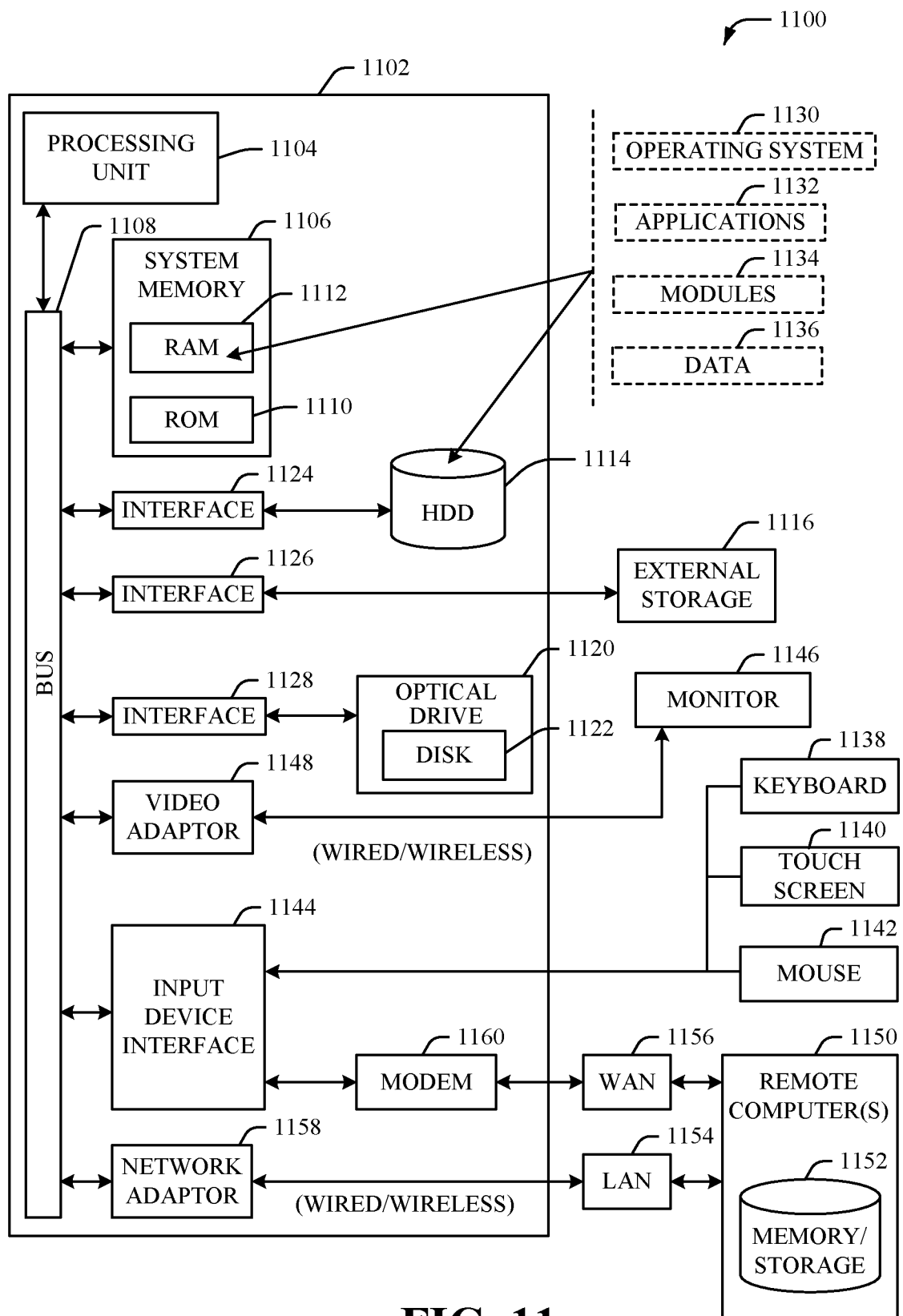
FIG. 11 illustrates an example block diagram of an example computer/machine system operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD), non-volatile memory and other storage technology could be used in addition to, or in place of, an HDD 1114, and can be internal or external. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor of the system, facilitate performance of operations, the operations comprising:
determining, based on a network event dataset observed in a mobile communications network with respect to a mobile device, that the mobile device has traveled at a speed that exceeds a threshold speed that indicates possibly improper mobile device usage, wherein the network event dataset is obtained by reducing a total number of events associated with the mobile device; and
in response to the determining, generating an alert.

2. The system of claim 1, wherein the network event dataset comprises call detail records.

3. The system of claim 1, wherein the network event dataset comprises radio access network events.

4. The system of claim 1, wherein the network event dataset identifies the mobile device based on an international mobile equipment identifier associated with the mobile device and an international mobile subscriber identifier associated with the mobile device.

5. The system of claim 1, wherein the reducing of the total number of events associated with the mobile device to obtain the network event dataset comprises discarding events that involve handovers.

6. The system of claim 1, wherein the reducing of the total number of events associated with the mobile device to obtain the network event dataset comprises discarding events that involve adjacent cell sites.

7. The system of claim 1, wherein the reducing of the total number of events associated with the mobile device to obtain the network event dataset comprises maintaining a handover dataset comprising successful handover events of the mobile device between cell sites, evaluating the successful handover events with respect to a data structure representing adjacent cell sites, and removing network events corresponding to the successful handover events that are between adjacent cell sites.

8. The system of claim 7, wherein the data structure comprises a sparse matrix.

9. The system of claim 1, wherein the operations further comprise identifying network events in the network event dataset that are within a threshold distance of an airport, and wherein the determining that the mobile device has traveled at the speed that exceeds the threshold speed comprises selecting as the threshold speed a first threshold speed for a respective time-ordered pair of network events in which at least one event of the respective time-ordered pair is within the threshold distance of the airport, and selecting a second threshold speed for time-ordered pairs of network events in which no event of the respective time-ordered pair is within the threshold distance of the airport.

10. The system of claim 1, wherein the operations further comprise identifying at least one of: network events in the network event dataset that indicate the mobile device is not connected to the network, or an area in which the mobile device has traveled that has inconsistent reception according to a consistency criterion.

11. A method, comprising:
determining, by a system comprising a processor, a travel jump by a mobile device that is indicative of likely improper mobile device usage, the determining comprising:
obtaining network events associated with a mobile device;
filtering out the network events that result from a handover between adjacent cell towers to provide a network event dataset; and
for respective pairs of events in the network event dataset that are adjacent in time and for which a cell tower changed:
selecting a pair of events of the respective pairs of events, resulting in a selected pair of events,
determining a pair of estimated locations corresponding to the selected pair of events, determining, based on the pair of estimated locations, a distance between the pair of estimated locations, obtaining a time difference between the selected pair of events, determining an estimated speed based on the distance and the time difference, determining whether the estimated speed exceeds a threshold speed, and in response to determining that the estimated speed exceeds the threshold speed, generating an alert.

12. The method of claim 11, wherein the obtaining of the network events associated with the mobile device comprises obtaining the network events for which cell towers have been determined to have changed between respective pairs of network events.

13. The method of claim 11, wherein the determining of the estimated locations corresponding to the selected pair of events comprises evaluating respective signal quality data with respect to the selected pair of events and cell tower locations associated with the selected pair of events.

14. The method of claim 11, further comprising identifying, by the system in the network event dataset, a cell site within a threshold distance of an airport, and, for the selected pair of events, selecting as the threshold speed a first threshold speed for in which at least one event of the selected pair of events is within the threshold distance of the airport, and selecting a second threshold speed for in which no event of the pair of events are within the threshold distance of the airport.

15. The method of claim 11, further comprising identifying, by the system in the network event dataset, radio event data indicating that disconnection of the mobile device from the network is a likely cause of the travel jump.

16. The method of claim 11, further comprising identifying, by the system in the network event dataset, radio event data indicating an estimated location in which inconsistent reception is a likely cause of the travel jump.

17. A non-transitory machine-readable medium, comprising executable instructions that, when executed by a processor, facilitate performance of operations, the operations comprising:

processing respective time-ordered pairs of network events associated with a mobile device, in which the respective time-ordered pairs indicate respective handovers in cell towers, comprising:

evaluating a pair of network events that did not result from handover of the mobile device from one cell tower to an adjacent cell tower;

determining an estimated speed of travel of the mobile device based on data from the pair of network events;

determining whether the estimated speed of travel of the mobile device indicates potentially improper mobile device usage; and in response to determining that the estimated speed of travel of the mobile device indicates the potentially improper mobile device usage, generating an alert.

18. The non-transitory machine-readable medium of claim 17, wherein the data in the pair of network events comprises time data, cell tower location data and signal quality data.

19. The non-transitory machine-readable medium of claim 17, wherein the determining whether the estimated speed of travel of the mobile device indicates the potentially improper mobile device usage comprises comparing the estimated speed with an air travel threshold speed limit when the data in the pair of network events indicates a cell tower that is within a specified distance of an airport.

20. The non-transitory machine-readable medium of claim 17, wherein the evaluating of the pair of network events that did not result from handover of the mobile device from the one cell tower to the adjacent cell tower comprises maintaining a sparse matrix that represents adjacent cell towers, determining, based on the sparse matrix, when respective pairs of cell towers, which correspond to respective pairs of events, are adjacent, and eliminating respective pairs of events that resulted from ones of the respective handovers of the mobile device between cell towers that are adjacent.

* * * * *